United States Patent [19]
Fukuda et al.

[11] Patent Number: 5,782,422
[45] Date of Patent: Jul. 21, 1998

[54] METAL PLATE MEMBER FORMING A PORTION OF A CASSETTE HOUSING FOR A RECORDING MEDIUM STORAGE CASSETTE

[75] Inventors: Taizo Fukuda; Shuichi Kikuchi; Kazuo Sasaki, all of Miyagi, Japan

[73] Assignee: Sony Corporation, Tokyo, Japan

[21] Appl. No.: 612,020

[22] Filed: Mar. 5, 1996

[30] Foreign Application Priority Data

Mar. 7, 1995 [JP] Japan ................................. 7-047579

[51] Int. Cl.$^6$ ................................................. G03B 23/02
[52] U.S. Cl. ................................................. 242/347
[58] Field of Search ................................. 242/347, 347.1, 242/347.2

[56] References Cited

U.S. PATENT DOCUMENTS

| | | | |
|---|---|---|---|
| 4,267,986 | 5/1981 | Uemura et al. | 242/347 X |
| 4,452,408 | 6/1984 | Sasaki | 242/347 X |
| 5,022,520 | 6/1991 | Yeol et al. | 242/347.1 X |
| 5,088,656 | 2/1992 | Yamamoto et al. | 242/347 |
| 5,412,525 | 5/1995 | Ota et al. | 242/347.1 X |

*Primary Examiner*—Daniel P. Stodola
*Assistant Examiner*—Gregory J. Strimbu
*Attorney, Agent, or Firm*—Frommer Lawrence & Haug LLP; William S. Frommer

[57] ABSTRACT

A recording medium storage cassette includes a cassette housing composed of an upper cassette shell and a lower cassette shell and in which a part of an outer ornamented body of the cassette is formed of a metal plate member made by press-treatment.

14 Claims, 9 Drawing Sheets

METAL PLATE MEMBER FORMING A PORTION OF A CASSETTE HOUSING FOR A RECORDING MEDIUM STORAGE CASSETTE

BACKGROUND OF THE INVENTION

The present invention relates to a recording medium storage cassette, and more particularly to a recording medium storage cassette which is advantageous in view of strength.

An example of the conventional recording medium storage cassette will be first described with reference to FIGS. 1 to 4.

FIGS. 1 and 2 show an example of a so-called D8 cassette. This D8 cassette is an 8-mm video cassette which is originally developed to record a video image but which is used to record data.

In FIGS. 1 and 2, there is shown a D8 cassette 1. A cassette housing 2 thereof is formed of an upper cassette shell 3 and a lower cassette shell 4 which are assembled and then fixed each other by a screw or the like.

The upper cassette shell 3 and the lower cassette shell 4 forming the cassette housing 2 are each made by injection molding of resin material (which is made by mixing, for example, ABS and polycarbonate and then adding about 15 weight % of glass fiber to the resultant mixture).

Within the cassette housing 2, a pair of reels (a take-up side reel 6 and a supply side reel 7) are rotatably accommodated in correspondence with left and right drive shaft insertion apertures 5a and 5b which are formed through the lower cassette shell 4.

The reels 6 and 7 are each formed of hubs 6a, 7a and upper and lower flanges 6b, 6c and 7b, 7c. A magnetic tape 8 as a recording medium is wound around the hubs 6a, 7a of reels 6, 7 under the state that both end portions of the tape 8 are fixed to the hubs 6a, 7a, respectively.

In the reels 6 and 7, the hubs 6a, 7a and the lower flanges 6c, 7c are molded integrally, and the upper flanges 6b, 7b made separately are fixed to the hubs 6a, 7a, respectively.

Tape guides 9a, 9b are formed on left and right front portions of the lower cassette shell 4. The magnetic tape 8 led from the supply side reel 7 passes through the tape guide 9b, the front surface portion of the cassette housing 2, then through the tape guide 9a, and then is taken up by the take-up side reel 6.

A lid 10 is rotatable attached to the cassette housing 2 so as to protect the magnetic tape 8 which passes through the front surface portion of the cassette housing 2. The lid 10 covers the portion of the magnetic tape 8 exposed to the front surface portion of the cassette housing 2 when the cassette 1 is not used, while when the cassette 1 is used (when the cassette is inserted into a cassette deck not shown), the lid 10 is rotated upward and opened to expose the magnetic tape 8.

In the cassette 1 information identifying portions 10a and 10b are provided on the cassette housing 2 at its left and right rear end portions, respectively, as shown in FIG. 2. The information identifying portions 10a, 10b identify and detect a kind and recording time of the magnetic tape 8, whether or not recording is possible or the like dependent on the position of an identifying slide member (not shown) and the opening state of an identifying hole.

FIGS. 3 and 4 show an example of a so-called DDS cassette. This DDS cassette is a tape cassette for a DAT (digital audio tape recorder) which is originally developed to record an audio signal but which is used to record data.

In FIGS. 3 and 4, the DDS cassette is generally shown at 21. A cassette housing 22 of this DDS cassette 21 is formed of an upper cassette shell 23 and a lower cassette shell 24 which are assembled and then fixed each other by screws or the like. Each of the upper cassette shell 23 and the lower cassette shell 24 forming the cassette housing 22 is formed by injection molding of resin material.

Within the cassette housing 22, a pair of hubs (take-up side hub 26 and supply side hub 27) are rotatably accommodated in correspondence with left and right hub drive shaft insertion apertures 25a and 25b formed through the lower cassette shell 24. A magnetic tape 28 as a recording medium is wound around the hubs 26 and 27.

A window portion 29 made of a transparent resin material is provided on the center portion of the upper cassette shell 23. The magnetic tape 28 wound around the hubs 26, 27 can be visually confirmed by the user through the window portion 29.

The magnetic tape 28 unreeled from the supply side hub 27 passes through the from surface portion of the cassette housing 22 and then is taken up by the take-up side hub 26.

A lid 30 is rotatably attached to the cassette housing 22 in order to protect a part of the magnetic tape passing through the front surface portion of the cassette housing 22, when the cassette 21 is not used, the lid 30 covers a part of the magnetic tape 28 exposed to the front surface portion of the cassette housing 22. On the other hand, when the cassette 21 is used (cassette is inserted into a cassette deck not shown), the lid 30 is rotated upward and then opened to thereby expose the magnetic tape 28.

In the DDS cassette 21, its portion corresponding to the rear side of the magnetic tape 28 passing through the front surface portion of the cassette housing 22 is recessed and opened to thereby provide a pocket portion 31 on the bottom side of the cassette housing 22. This pocket portion 31 is such a portion into which a tape loading member of the cassette deck is inserted when the cassette 21 is inserted into the cassette deck.

Further, in the DDS cassette 21, a slider 32 is slidably mounted on the bottom surface side of the lower cassette shell 24 of cassette housing 22 so as to open and/or close the hub drive shaft insertion apertures 25a, 25b and the pocket portion 31.

The slider 32 has formed therethrough apertures 33a, 33b which correspond to the hub drive shaft insertion apertures 25a, 25b of the lower cassette shell 24, respectively. The slider 32 is mounted on the lower cassette shell 24 to be slidable in the front and rear directions relative to the cassette housing 22.

Similarly to the cassette housing 22, the slider 32 is molded by using the resin material.

When the cassette 21 is not in use, as shown in FIG. 4A, the slider 32 is located at a front position. Under this state, the apertures 33a, 33b do not oppose the hub drive shaft insertion apertures 25a, 25b so that the hub drive shaft insertion apertures 25a, 25b are closed by the slider 32 and the pocket portion 31 is also closed by the slider 32.

When the cassette 21 is inserted into the cassette deck, the slider 32 is slid in the rear direction and located at a rear position shown in FIG. 4B. As shown in FIG. 4B, under this state the apertures 33a, 33b are moved to the positions corresponding to the hub drive shaft insertion apertures 25a, 25b respectively so that the hub drive shaft insertion apertures 25a, 25b are opened and the pocket portion 31 is also opened.

The slider 32 has formed therethrough engaging apertures 34a, 34b which form a slider locking mechanism. When a slider lock piece formed on the lower cassette shell 24 side of the cassette housing 22 engages with the engaging aperture 34a or 34b, the slider 32 is locked at the front position (closed position) or at the rear position (opened position). However, the detailed illustration and description of the slider locking mechanism will be omitted here because the slider locking mechanism has no direct relation to the present invention.

Recently, it is strongly requested that the above described D8 cassette and DDS cassette have an increased recording capacity and capability to preserve various information data. The D8 cassette and the DDS cassette are further required to have the ability to protect the recorded data in more severe circumstance.

The fact that upper and lower cassette shells of the conventional cassette housing which are an outside ornamental body are molded by use of only the resin material is insufficient in view of strength under the above severe circumstance.

Especially, since a cassette for recording data and preserving the same is sometime used under the severe conditions, it is required that the cassette cope with such severe conditions.

SUMMARY OF THE INVENTION

In view of the aforesaid aspect, it is an object of the present invention is to provide a recording medium storage cassette which has a sufficient strength.

Another object of the present invention is to provide a recording medium storage cassette which can preserve recorded data even under a severe circumstance.

According to an aspect of the present invention, there is provided a recording medium storage cassette in which a part of its outside ornamental body, for example, a part of a side wall between upper and lower cassette shells of a cassette housing, a part of the upper cassette shell, a part of the lower cassette shell, a slider mounted on the bottom surface side of the lower cassette shell or the like is made of a metal plate member.

DETAILED DESCRIPTION OF THE PREFERRED EMBODIMENTS

The present invention will be described with reference to the drawings.

Figure 1:
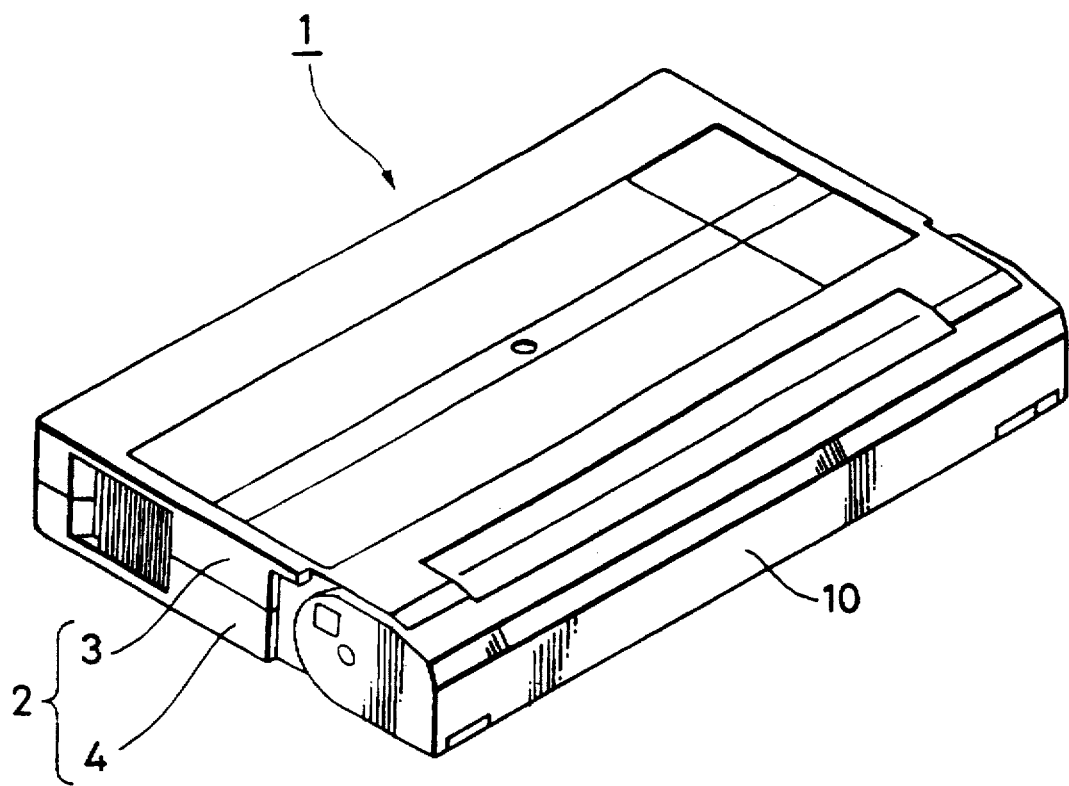
FIG. 1 is a perspective view showing a conventional D8 cassette.
Figure 2:
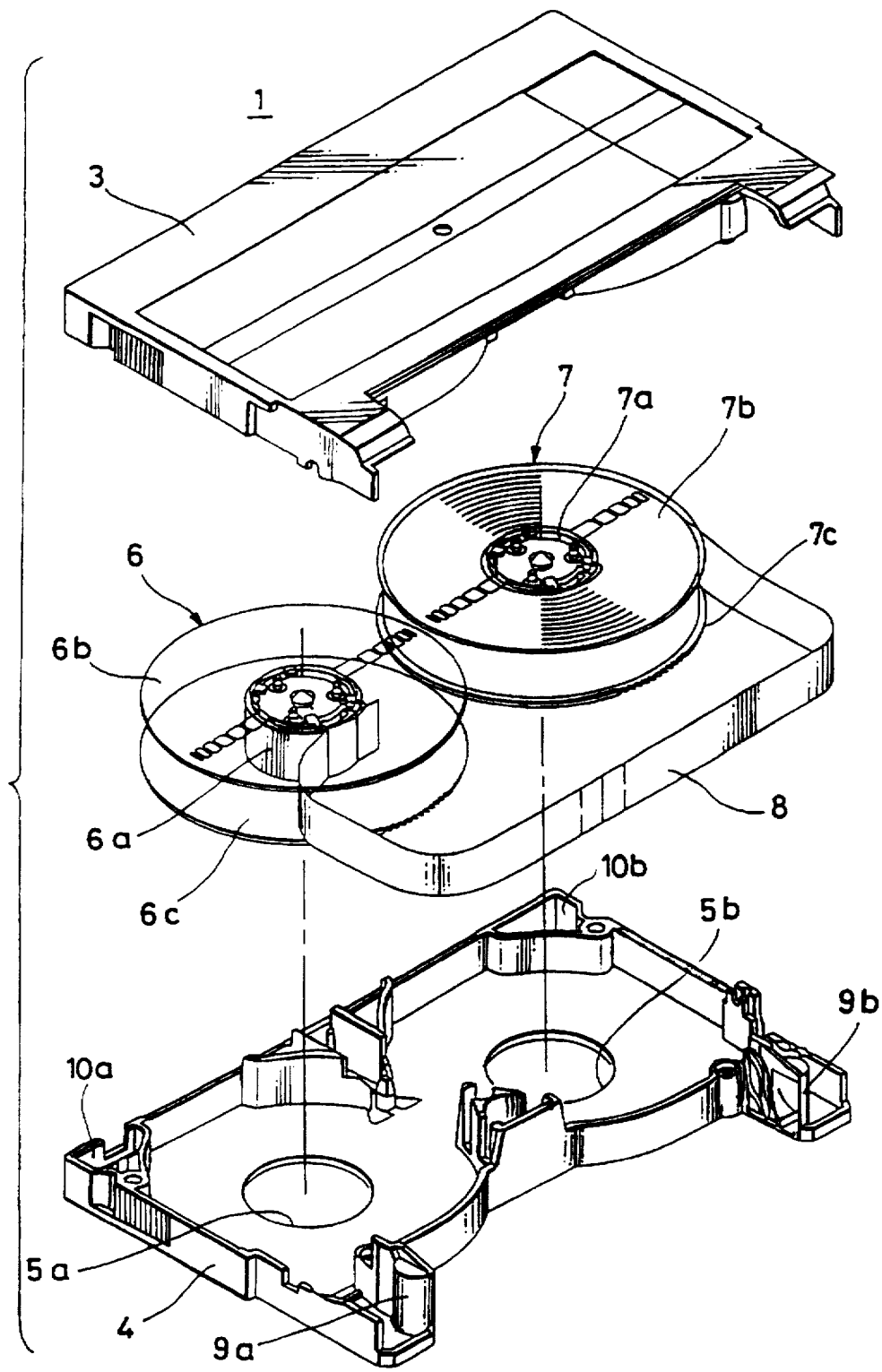
FIG. 2 is an exploded view of the D8 cassette shown in FIG. 1.

FIGS. 5 to 9 show the D8 cassette according to the present invention. In FIGS. 5 to 9, like elements and parts corresponding to those of the example shown in FIGS. 1 and 2 are marked with the same reference numerals.

Figure 5:
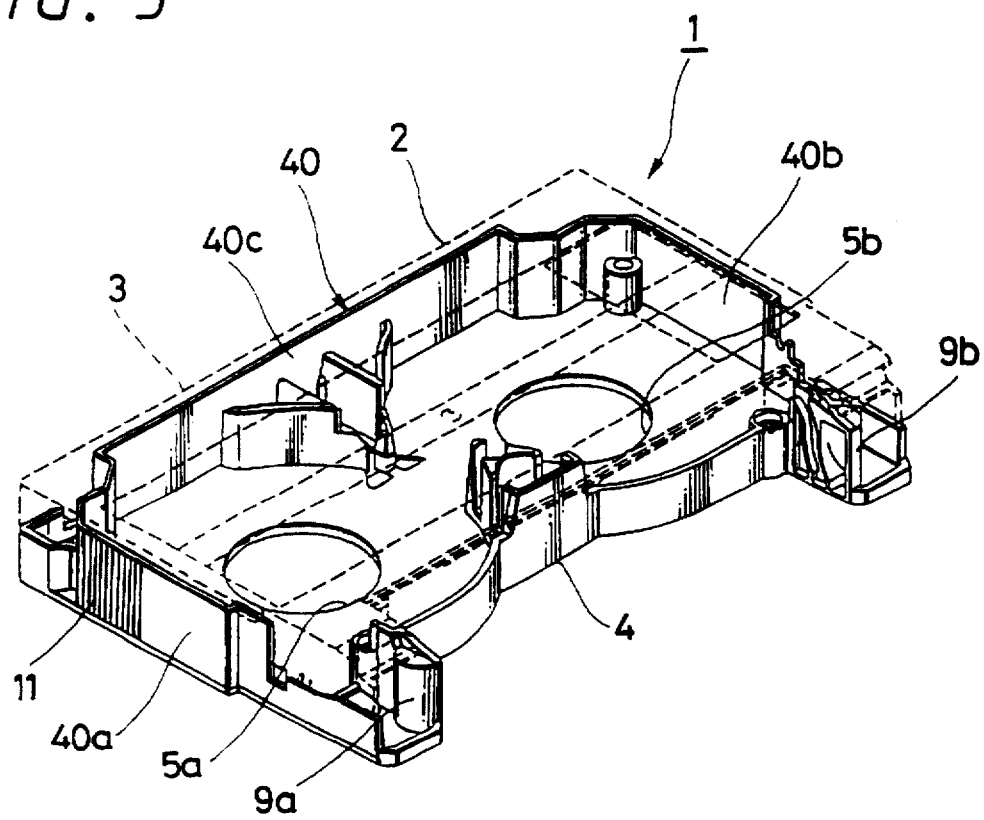
FIG. 5 is a perspective view showing an embodiment of a D8 cassette according to the present invention in which a part of the side wall between an upper cassette shell and a lower cassette shell of a cassette housing is made of a metal plate member.
Figure 6:
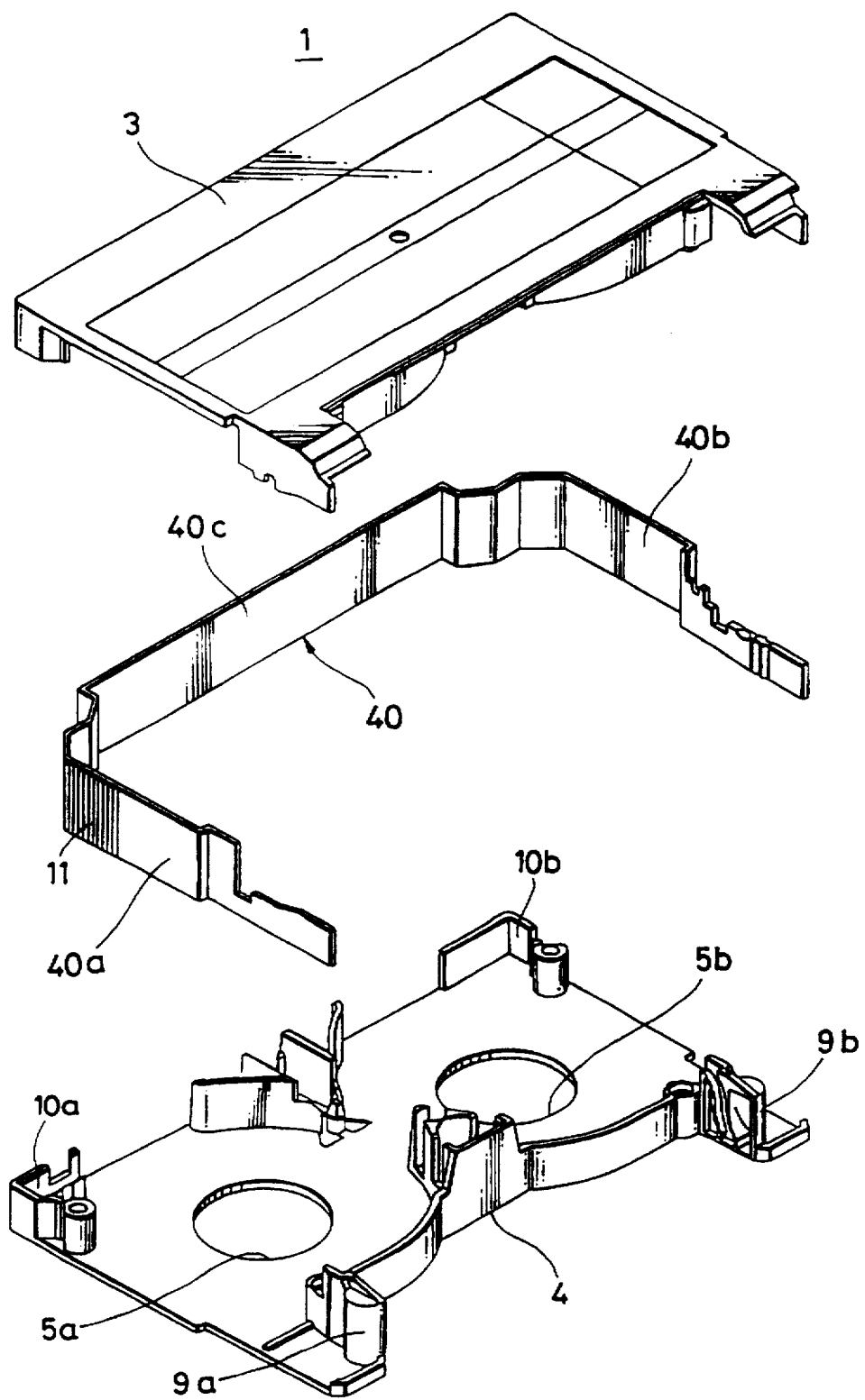
FIG. 6 is an exploded view of the D8 cassette shown in FIG; 5.

A D8 cassette 1 shown in FIGS. 5 and 6 is such an example in which a part of the side walls between an upper cassette shell 3 and a lower cassette shell 4 of a cassette housing 2 is made of a metal plate member 40. Specifically, in this example both of left and right side walls of the cassette housing 2 and its rear side wall except for parts thereof are replaced with a metal plate member made of aluminum, stainless steel or the like.

The upper cassette shell 3 and the lower cassette shell 4 are made of the resin material same as those used in the prior art. The shapes of the upper and lower cassette shells 3 and 4 are such shapes that the left and right side walls and the rear side wall are removed except for some parts as will be clear from the comparison with the conventional example. In the present example, the metal plate member 40 is used in place of the walls removed.

The metal plate member 40 is bent to be a substantially U-letter shape in which left and right side wall portions 40a, 40b and a rear side wall portion 40c are contiguous. A number of grooves or concaves 11 are engraved on each of the outer surface of the left and right side wall portions 40a, 40b at their rear end portions as grip portions when the cassette 1 is gripped. In this case, corner portions between each of the left and right side wall portions 40a, 40b and the rear side wall portion 40c are bent inwardly so as to escape the information identifying portions 10a, 10b, respectively.

The metal plate member 40 is formed by a press working. Specifically, a metal flat plate made of aluminum, stainless steel or the like is punched out by a press machine with a die of a predetermined shape first and then the punched out metal plate is further bent by the press machine to provide the metal plate member 40 with the shape shown in, for example, FIG. 5. Further, the grooves 11 can be easily engraved by the press machine.

Furthermore, though not illustrated on the drawing, a label area (concave portion to which a label is attached) may be formed on the outer surface of the rear side wall portion 40c of the metal plate member 40 at a predetermined portion thereof a press. Also, a logotype, a design pattern or the like can be easily engraved on the outer surface of the metal plate member 40 at a suitable portion by press-treatment.

Figure 7A:
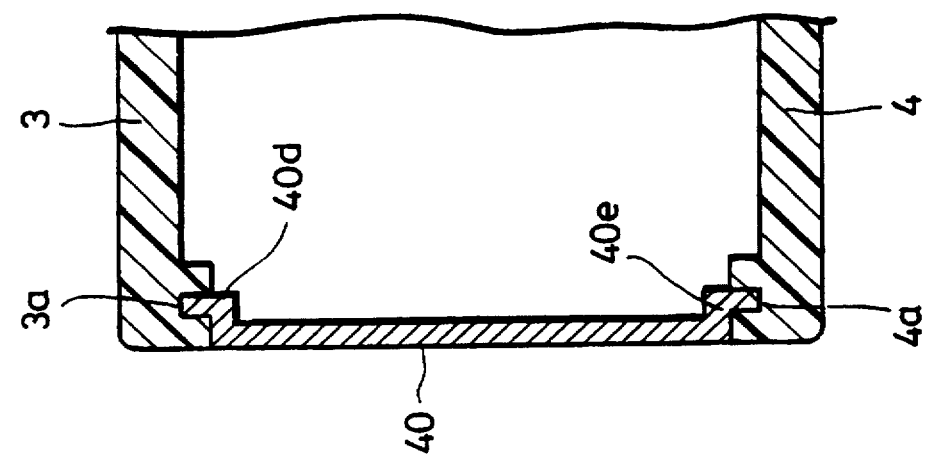
FIG. 7A and 7B are cross-sectional diagrams showing examples to fix a metal plate member to the upper cassette shell and the lower cassette shell.
Figure 7B:
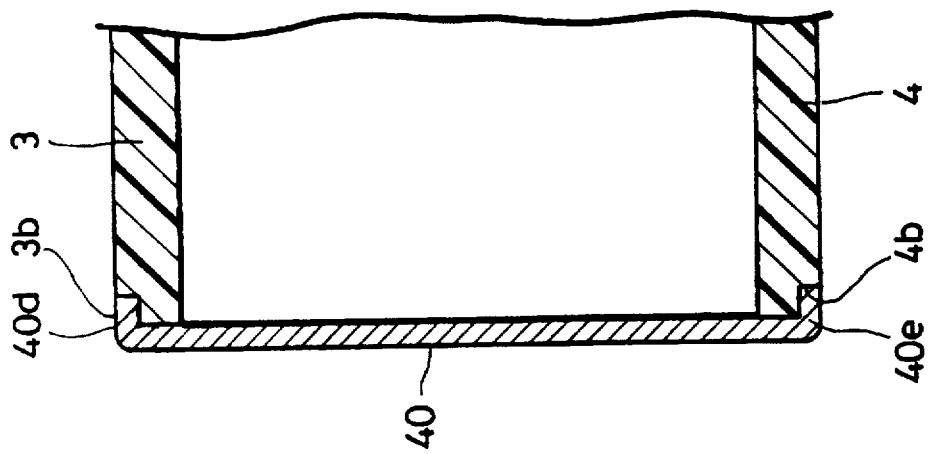

FIG. 7A and 7B shows examples of fixed states of the metal plate member 40 to the upper cassette shell 3 and the lower cassette shell 4.

FIG. 7A shows such a fixing structure that the metal plate member 40 is sandwiched between the upper cassette shell 3 and the lower cassette shell 4 and then fixed. Specifically, in the example of FIG. 7A, upper and lower end edge portions 40d, 40e of the metal plate member 40 are further bent inwardly at a right angle and then the tip end portions thereof are bent upwards and downwards at a right angle, respectively. When the upper cassette shell 3 and the lower cassette shell 4 are fastened together, the tip end portions of the upper and lower end edge portions 40d, 40e of the metal plate member 40 are engaged with concave-shaped grooves 3a, 4a of the upper and lower cassette shells 3, 4, respectively, so that the metal plate member 40 is sandwiched between the upper cassette shell 3 and the lower cassette shell 4.

FIG. 7B shows such a fixing structure that the metal plate member 40 is engaged with the upper cassette shell 3 and the lower cassette shell 4 to hold both the cassette shells. In this example, the upper and lower end edge portions 40d, 40e of the metal plate member 40 are bent inwardly at a right angle, respectively. After the upper cassette shell 3 and the lower cassette shell 4 are formed, the upper and lower end edge portions 40d, 40e of the metal plate member 40 are respectively engaged with concave-shaped step portions 3b, 4b formed on the upper cassette shell 3 and the lower cassette shell 4 at the outer surfaces thereof such that the metal plate member 40 is engaged by pressure between the upper cassette shell 3 and the lower cassette shell 4.

In this example, the metal plate member 40 may be fixed to the upper cassette shell 3 and the lower cassette shell 4 by an adhesive.

In any of the examples shown in FIGS. 7A and 7B, the inside of the cassette housing 2 is kept in a high sealing state and hence a sufficient dust-proof effect can be presented.

According to the example shown in FIG. 7B, it is difficult for a user to disassemble the upper cassette shell 3 and the lower cassette shell 4 easily so that the safe property as a cassette is increased.

In the above examples shown in FIGS. 7A and 7B, the bent shapes of the upper and lower end edge portions 40d, 40e of the metal plate member 40 are easily formed by a press.

As described above, the cassette 1 of the present examples, since parts of the side walls or the like between the upper cassette shell 3 and the lower cassette shell 4 made of the resin material are formed of the metal plate member 40, the strength such as the abrasion resistance, the torsion rigidity, the shock resistance or the like of the whole cassette is highly improved as compared with the prior art.

Further, since the metal plate member 40 is used, the cassette 1 is increased in quality and strength so that there is presented a high-grade aesthetic feel of the cassette which is not obtained by the prior art.

Further, according to the cassette 1 of the present example, since almost all the left and right side wall portions and the rear side wall portion are formed of the metal plate member 40, the strength of the entirety of the cassette 1 can be ensured by all the width of the metal plate member 40. Therefore, it is possible to realize a more durable cassette.

Figure 8:
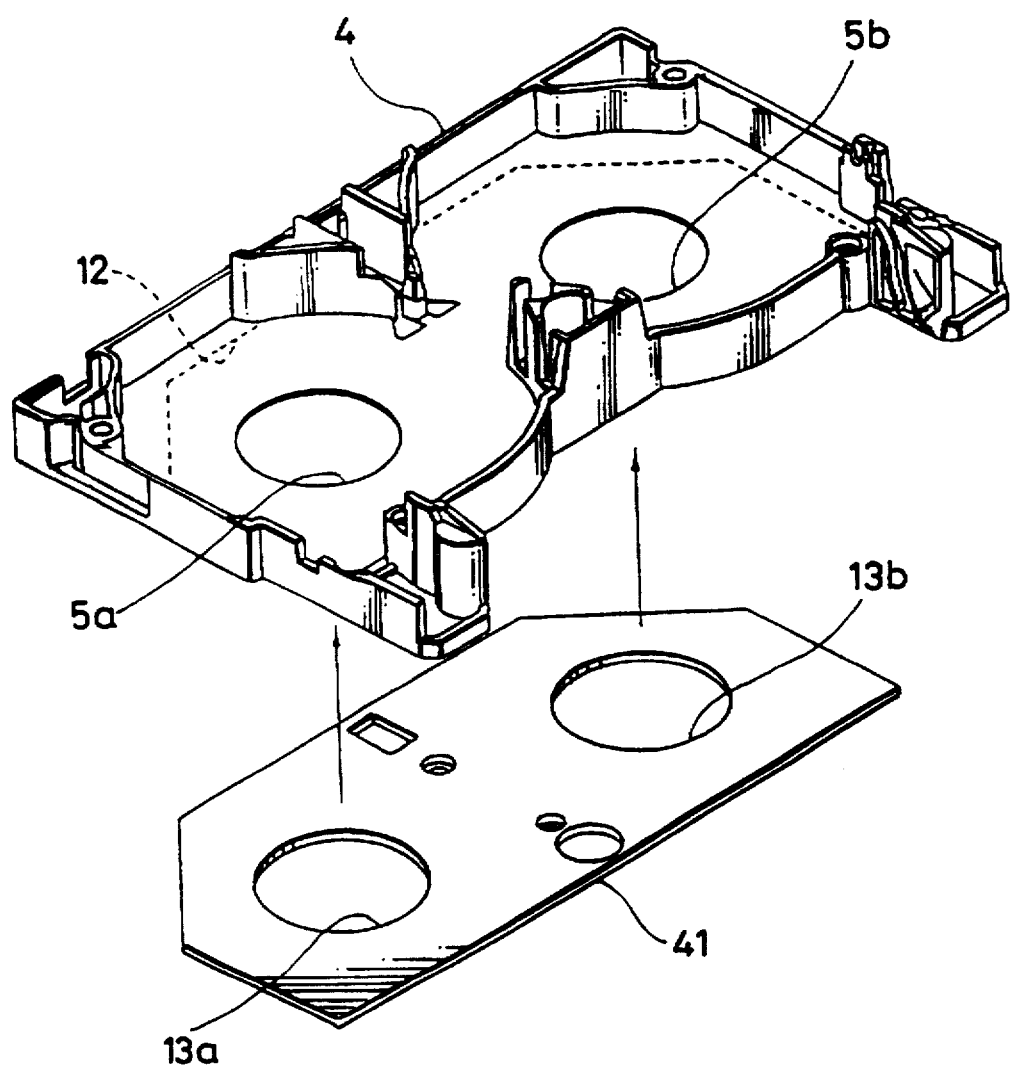
FIG. 8 is a perspective view showing the lower cassette shell of the D8 cassette in which a part of the lower cassette shell is formed of a metal plate member.
Figure 9:
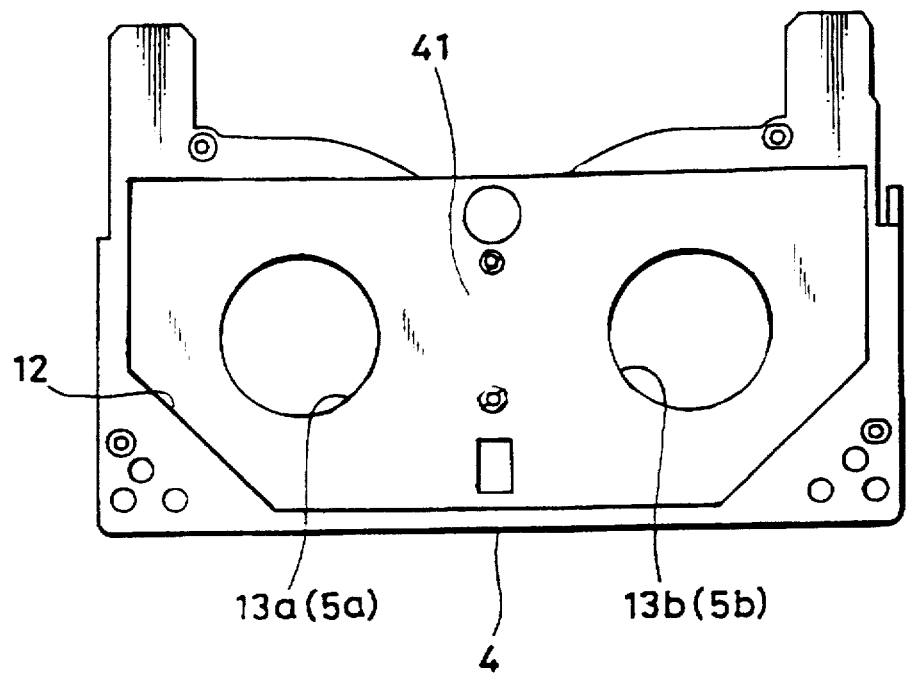
FIG. 9 is a plan view showing the bottom surface of the lower cassette shell of the D8 cassette.

FIGS. 8 and 9 show an example of the D8 cassette according to the present invention in which a part of the lower cassette shell 4 is formed of a metal plate member 41. In this example, a central surface portion on the bottom surface of the lower cassette shell 4 except for a reference surface (a surface portion by which the cassette is supported in a cassette deck) is replaced with the metal plate member 41 made of aluminum, stainless steel or the like.

The lower cassette shell 4 is formed of the resin material similar to the prior art. On a central surface portion of the bottom surface of the lower cassette shell 4, there is formed a concave portion 12 whose depth is selected substantially equal to the thickness of the metal plate member 41. The metal plate member 41 is embedded in the concave portion 12 and then fixed hereto.

A double-sided adhesive tape is preferably used as a fixing means to fix the metal plate member 41 to the lower cassette shell 4. Alternatively, an adhesive can be employed for the same purpose.

Further, when the lower cassette shell 4 is molded, it may be molded integral with the metal plate member 41 by insert-molding or outsert-molding.

The metal plate member 41 is also shaped by press-treatment, specifically, a metal flat plate made of aluminum, stainless steel or the like is punched out by a press machine with a predetermined die to thereby make the metal plate member 41 with a shape shown in FIG. 9, for example.

Although the metal plate member 41 includes a number of apertures in addition to apertures 13a, 13b which correspond to the reel drive shaft insertion apertures 5a, 5b of the lower cassette shell 4, these apertures can be bored easily by the press machine.

As described above, according to the example of the cassette shown in FIGS. 8 and 9, since a part of the lower cassette shell 4 of the cassette housing 2 made of the resin material is formed by the metal plate member 41, the strength such as the abrasion resistance, torsion rigidity, shock resistance or the like of whole the cassette is improved much as compared with the prior art.

Also, since the metal plate member 41 is used, the quality and strength of the whole cassette are increased and hence a high-grade feeling of the cassette can be presented.

Figure 3:
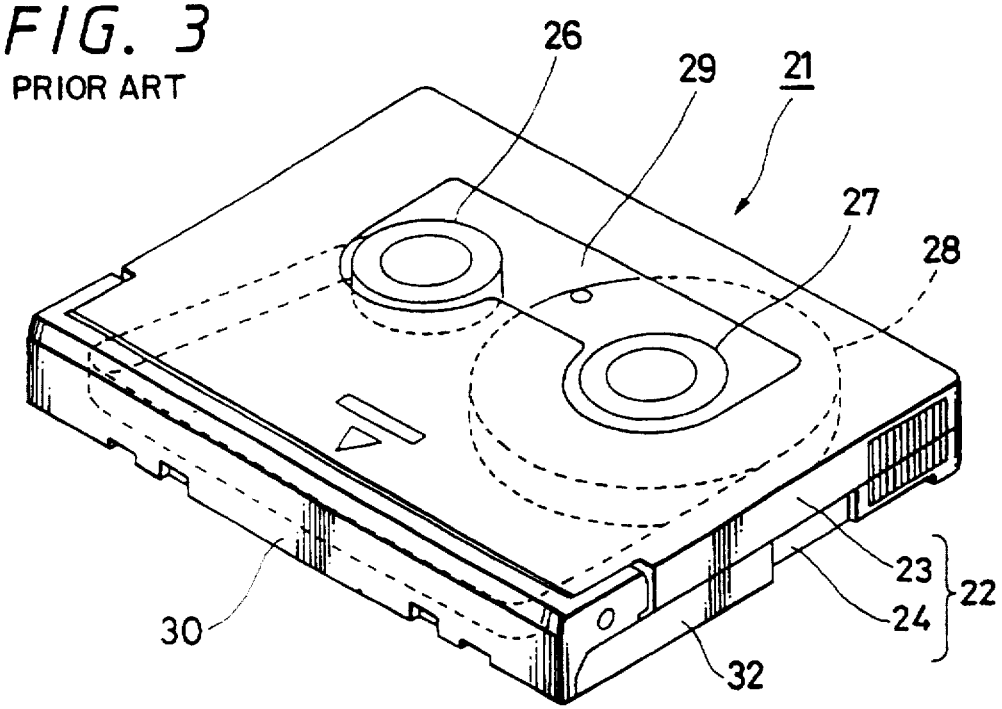
FIG. 3 is a perspective view showing a conventional DDS cassette.
Figure 4A:
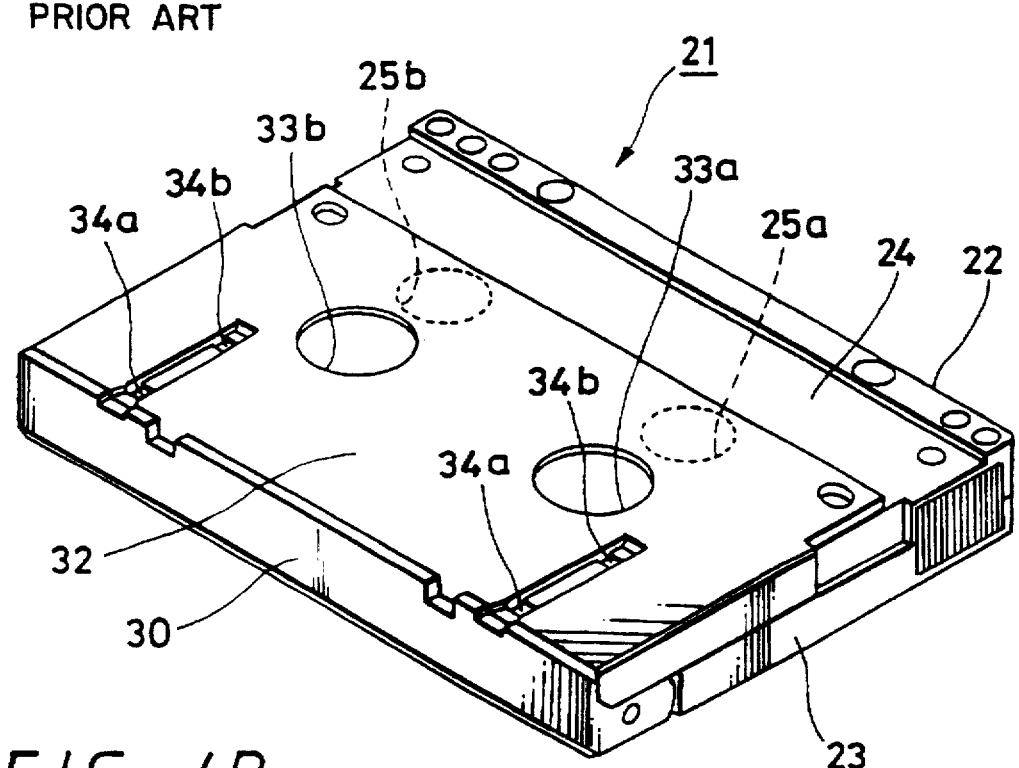
FIG. 4A is a perspective view showing the rear side of the DDS cassette shown in FIG. 3 and the slider 32 is in a position during non-use.
Figure 4B:
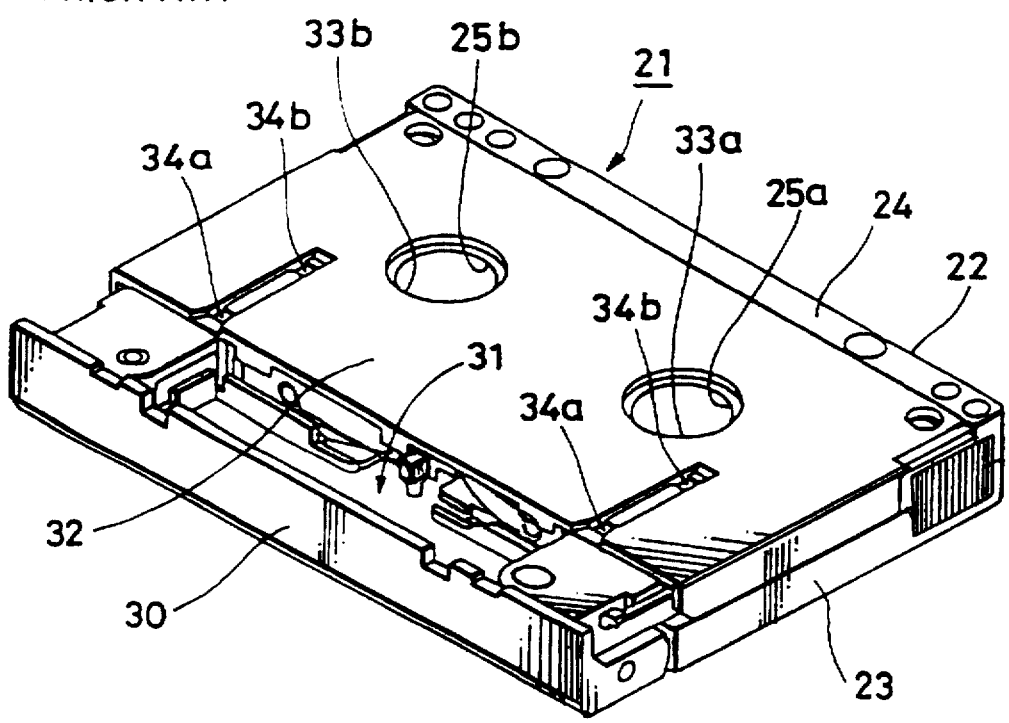
FIG. 4B is a perspective view showing the rear side of the DDS cassette shown in FIG. 3 and the position of the slider 32 when the cassette is inserted into a cassette deck.
Figure 10:
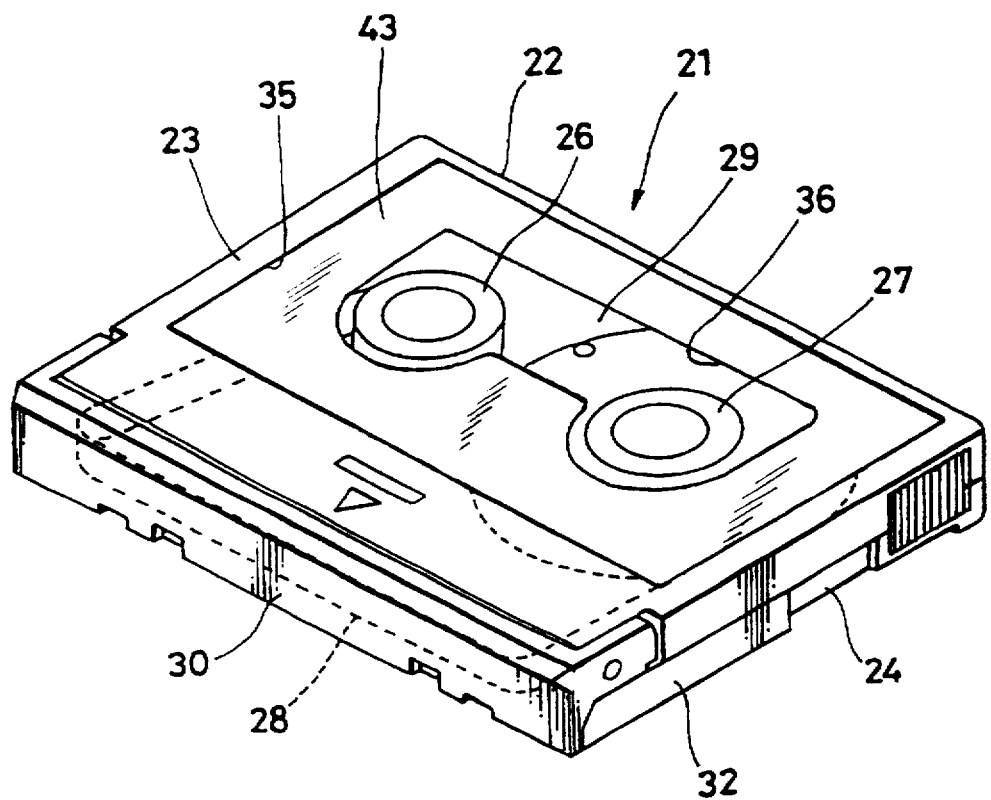
FIG. 10 is a perspective view showing an embodiment of the DDS cassette according to the present invention in which a part of the upper cassette shell is made of a metal plate member.

FIG. 10 shows an embodiment of the DDS cassette according to the present invention. In the embodiment of FIG. 10, elements and parts identical to those of the conventional example shown in FIGS. 3 and 4 are marked with the same reference numerals, respectively.

FIG. 10 shows such a DDS cassette 21 in which a part of an upper cassette shell 23 of a cassette housing 22 is formed of a metal plate member. In other words, a center surface portion surrounding a window portion 29 of the upper cassette shell 23 is replaced by a metal plate member 43 made of aluminum, stainless steel or the like.

In this embodiment, the upper cassette shell 23 is made of the resin material similar to the prior art and a concave portion 35 is formed on the upper cassette shell 23 at its upper center surface portion stepped downwards from a normal standard surface by a depth substantially equal to the thickness of the metal plate member 43. Then, this metal plate member 43 is embedded in the concave portion 35 and fixed thereto.

A double-sided adhesive tape is preferable used as a means for fixing the metal plate member 43 to the upper cassette shell 23. Alternatively, an adhesive may be used for the same purpose.

Further, when the upper cassette shell 23 is molded, it may be molded integral with the metal plate member 43 by outsert molding or insert molding.

A window aperture 36 is formed through the metal plate member 43 at its center portion and a window plate made of a transparent resin material is engaged with and fixed to the window aperture 36 to thereby form a window portion 29.

The metal plate member 43 is also formed by a press work. Specifically, a metal flat plate made of aluminum, stainless steel and so on is punched out by a press machine with a predetermined die to produce the metal plate member 43 shown in FIG. 10. Also, the window opening 36 can be easily bored by the press machine.

It may be also possible that a logotype, a pattern or the like, though not shown, can be engraved on the surface of the metal plate member 43 by press-treatment.

According to the cassette 21 of this embodiment, since a part of the upper cassette shell 23 of the cassette housing 22 made of the resin material is formed of the metal plate member 43, the strength such as the abrasion resistance, torsion rigidity, shock resistance and so on of the whole cassette can be improved as compared with the prior art.

Further, the employment of the metal plate member 43 leads to the increase of the quality and massive sense of the whole cassette and presents a high-grade feeling which can not be obtained by the conventional cassette.

Especially, according to the embodiment shown in FIG. 10, since the metal plate member 43 is used on the upper surface portion of the upper cassette shell 23 which is upon initial impression aesthetically pleasing the effect presented by the employment of the metal plate member is remarkable.

Figure 11:
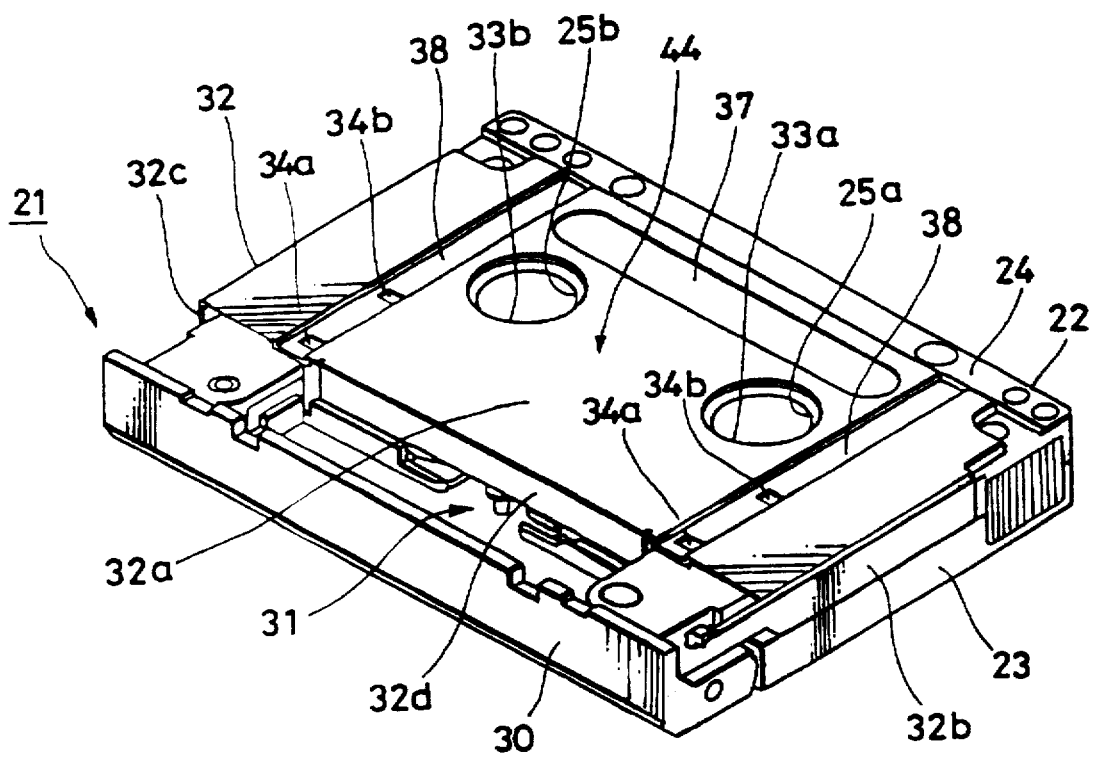
FIG. 11 is a perspective view showing the bottom surface of the DDS cassette according to the present invention in which a slider is made of a metal plate member.

FIG. 11 shows an embodiment of a cassette 21 according to the present invention in which a slider 32 slidably mounted on the bottom side of a lower cassette shell 24 of a cassette housing 22 is made of a metal plate member 44.

The slider 32 is formed of the metal plate member 44 which integrally comprises a bottom plate portion 32a along the bottom surface of the lower cassette shell 24 and side plate portions 32b, 32c, which are bent from the left and right side edges of the bottom plate portion 32a at a right angle and extended along the left and right side surfaces of the lower cassette shell 24. Further the metal plate member 44 integrally comprises a front plate portion 32d bent from the front side of the bottom plate portion 32a to the inside of a pocket portion 31.

Figure 12:
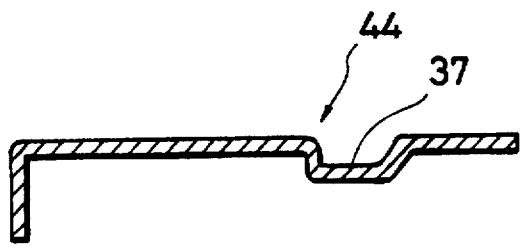
FIG. 12 is a cross-sectional view showing an embossing portion formed on the metal plate member.

The bottom plate portion 32a has apertures 33a, 33b, which correspond to the hub drive shaft insertion apertures 25a, 25b of the lower cassette shell 24, respectively, an embossed portion 37 (See FIG. 12) in order to reinforce the thin metal plate member 44, side embossed portions 38 so as to reduce the contact area of the slider 32 with the lower cassette shell 24 and slider locking engaging apertures 34a, 34b on the embossed portions 38.

The slider 32 is formed by press-treatment work. Specifically, a metal flat plate made of aluminum, stainless steel or the like is punched out by a press machine with a predetermined die, and then the punched out metal flat plate is bent by the press machine to be the shape shown in FIG. 11. Further, the embossed portions 37, 38, and further apertures 33a, 33b, and 34a, 34b are formed by the press machine to thereby form the slider 32.

As described above, according to the cassette 21 shown in FIG. 11, since the slider 32 slidably mounted on the lower cassette shell 24 of the cassette housing 22 is made of the metal plate member 44, the strength such as the abrasion resistance, torsion rigidity, shock resistance or the like of the whole cassette is improved as compared with the prior art. Especially, since the slider 32 is a sliding part, the cassette shown in FIG. 11 is effective in view of the abrasion resistance.

Further, since the metal plate member 44 is used as the slider 32, the quality and the strength of the whole cassette are improved and hence the cassette with high-grade feeling can be presented.

In each of the above-mentioned embodiments, as the materials suitable for the metal plate members 40, 41, 43, and 44 there can be exemplified aluminum (JIS. A-5051, H-34), stainless steel (JIS. SUS-303, SUS-403) or the like.

Since these metal plate members 40, 41, 43, and 44 can be each formed by press-treatment, the productivity thereof is excellent, the manufacturing thereof is simple, and they are suitable for mass production, which leads to the advantage from a cost standpoint.

Further, the fact that on the surfaces of the metal plate members, logotypes, patterns and other shapes can be easily formed is one of the significant advantages of the present invention.

While in the above embodiments, a part of the side wall of the cassette housing as an outer ornamental body, a part of the upper cassette shell, a part of the lower cassette shell and the slider are each formed by the metal plate member, they may be combined. Then, the strength is further improved and a higher-grade feeling can be presented.

It is needless to say that the present invention is not limited to the D8 cassette and the DDS cassette described as embodiments, but the present invention can be widely applied to various kinds of tape cassettes, disk cassettes and so on.

Having described preferred embodiments of the invention with reference to the accompanying drawings, it is to be understood that the present invention is not limited to those precise embodiments and that various changes and modifications could be effected therein by one skilled in the art without departing from the spirit or scope of the invention as defined in the appended claims.

What is claimed is:

1. A cassette housing for a recording medium storage cassette comprising:

a lower cassette shell having a substantially concave opening provided in a central surface portion of a bottom surface thereof, said lower cassette shell including an insert member of a predetermined thickness, said insert member having a pair of reel drive shaft insertion apertures and being non-moveably secured within said substantially concave opening which has a depth which is substantially equal to the thickness of said insert member, said insert member being formed of a metal plate member.

2. The cassette housing for a recording medium storage cassette of claim 1 wherein said insert member is secured in said concave opening by an adhesive.

3. The cassette housing for a recording medium storage cassette of claim 1 wherein said insert member is formed by press treatment.

4. The cassette housing for a recording medium storage cassette of claim 1 wherein said insert member is formed of aluminum.

5. The cassette housing for a recording medium storage cassette of claim 1 wherein said insert member is formed of stainless steel.

6. A cassette housing for a recording medium storage cassette comprising:

an upper cassette shell providing a cover for the recording medium storage cassette and having a concave opening defining a downwardly stepped portion of an upper central surface portion of said upper cassette shell, said upper cassette shell having an insert member of a Predetermined thickness including a window aperture with said insert member being secured within said concave opening with said downwardly stepped portion having a depth substantially equal to the thickness of said insert member, said insert member being formed of a metal plate member.

7. The cassette housing for a recording medium storage cassette of claim 6 wherein said insert member is secured in said concave opening by an adhesive.

8. The cassette housing for a recording medium storage cassette of claim 6 wherein said insert member is formed by a press treatment.

9. The cassette housing for a recording medium storage cassette of claim 6 wherein said insert member is formed of aluminum.

10. The cassette housing for a recording medium storage cassette of claim 6 wherein said insert member is formed of stainless steel.

11. A cassette housing for a recording medium storage cassette comprising:

a lower cassette shell having a substantially concave opening provided in a central surface portion of a bottom surface thereof, said lower cassette shell including an insert member of a predetermined thickness having a pair of reel drive shaft insertion apertures and which is secured within said concave opening which has a depth which is substantially equal to the thickness of said insert member, said insert member being formed of a metal plate member and being secured in said concave opening by an adhesive.

12. The cassette housing for a recording medium storage cassette of claim 11 wherein said insert member is formed by press treatment.

13. The cassette housing for a recording medium storage cassette of claim 11 wherein said insert member is formed of aluminum.

14. The cassette housing for a recording medium storage cassette of claim 11 wherein said insert member is formed of stainless steel.

* * * * *